UNITED STATES PATENT OFFICE.

JOHN H. GOLL AND ALEXANDER SPINNER, OF SAN FRANCISCO, CAL.

IMPROVEMENT IN YEAST COMPOUNDS.

Specification forming part of Letters Patent No. 220,527, dated October 14, 1879; application filed October 18, 1878.

*To all whom it may concern:*

Be it known that we, JOHN HENRY GOLL and ALEXANDER SPINNER, both of the city and county of San Francisco, in the State of California, have invented a certain new and useful Compound called "Brewers' Yeast," which compound is fully described in the following specification.

This invention relates to that class of compounds used to raise dough in the manufacture of bread; and it consists in the mixture and combination of different ingredients together in the manner hereinafter described.

To prepare our improved brewers' yeast we first make a paste of the following ingredients: No. 1.—Rice-flour, two ounces; hop-water made from hops in about the proportion of two gallons of water to three ounces of hops, and this paste we allow to stand two days. We then prepare a mixture of the following ingredients: No. 2.—Corn-meal, one pound; boiling water, one quart; dried prunes, four ounces; raisins, one ounce, which are made into a paste with the white of four eggs, and cognac sufficient to mix the whole together. To this, when combined as described, we add a mixture of malt-flour and hop-water, made as before mentioned, in the proportion of one-half pound malt-flour to two gallons of hop-water. These are then mixed and thoroughly incorporated together, and then the first-described mixture, formed two days before, is added to the whole. This composition is then allowed to stand two days, when it is ready to be made into packages of any desired size for the market by expelling from it the liquid and excess of moisture.

For purposes of flavoring there can be added to the composition, before the raising mixture, or the one first described, is combined with it, a flavoring of any suitable aromatic spice, such as cinnamon or cloves, to counteract the peculiar odor and make a more agreeable article of sale or to keep in the house.

Having thus fully described our improved compound, what we claim is—

The yeast described, consisting of a paste composed of corn-meal, boiling water, dried prunes, raisins, whites of eggs, and cognac, mixed with malt-flour and hop-water, and then combined with a fermented mixture of rice-flour and hop-water, substantially as set forth.

In testimony that we claim the foregoing we have hereunto set our hands and seals this 3d day of September, 1878.

JOHN HENRY GOLL. [L. S.]
ALEXANDER SPINNER. [L. S.]

Witnesses:
C. W. M. SMITH,
EDWARD E. OSBORN.